United States Patent
Yang et al.

(10) Patent No.: US 9,336,573 B2
(45) Date of Patent: May 10, 2016

(54) SELF-ADAPTIVE IMAGE EDGE CORRECTION DEVICE AND METHOD THEREOF

(71) Applicant: Automotive Research & Test Center, Changhua County (TW)

(72) Inventors: Chih-Hung Yang, Changhua County (TW); Yu-Sheng Liao, Changhua County (TW); Li-You Hsu, Zhubei (TW)

(73) Assignee: AUTOMOTIVE RESEARCH & TEST CENTER, Lugang, Changhua County (TW)

( * ) Notice: Subject to any disclaimer, the term of this patent is extended or adjusted under 35 U.S.C. 154(b) by 329 days.

(21) Appl. No.: 13/967,915

(22) Filed: Aug. 15, 2013

(65) Prior Publication Data

US 2014/0294319 A1 Oct. 2, 2014

(30) Foreign Application Priority Data

Mar. 29, 2013 (TW) .............................. 102111435 A

(51) Int. Cl.
*G06T 5/00* (2006.01)

(52) U.S. Cl.
CPC ....... *G06T 5/003* (2013.01); *G06T 2207/20192* (2013.01)

(58) Field of Classification Search
CPC ....... G06T 3/0056; G06T 3/403; G06T 5/001; G06T 5/002; G06T 5/003; G06T 5/50; G06T 2207/20004; G06T 2207/20192
See application file for complete search history.

(56) References Cited

U.S. PATENT DOCUMENTS

| | | | | |
|---|---|---|---|---|
| 5,359,676 A * | 10/1994 | Fan | ........................ | H04N 1/411 375/E7.167 |
| 5,852,475 A * | 12/1998 | Gupta | ....................... | G06T 5/20 348/606 |
| 6,366,292 B1* | 4/2002 | Allen | ....................... | G06T 3/403 345/611 |
| 6,507,364 B1* | 1/2003 | Bishay | .................. | G06T 3/4007 348/242 |
| 6,570,616 B1* | 5/2003 | Chen | ....................... | G06T 3/4007 348/237 |
| 6,928,196 B1* | 8/2005 | Bradley | .................. | G06T 3/403 382/199 |
| 2002/0006231 A1 | 1/2002 | Jayant et al. | | |
| 2009/0226097 A1* | 9/2009 | Matsumoto | ............. | G06T 3/403 382/199 |

FOREIGN PATENT DOCUMENTS

| | | |
|---|---|---|
| CN | 101425178 | 5/2009 |
| CN | 102231203 | 11/2011 |
| TW | 201142741 | 12/2011 |

* cited by examiner

*Primary Examiner* — Andrew W Johns
(74) *Attorney, Agent, or Firm* — Muncy, Geissler, Olds & Lowe, P.C.

(57) ABSTRACT

A self-adaptive image edge correction device and method thereof, including an image fetching unit, an image processing unit, and an image output unit. Wherein, the image fetching unit is used to provide an original image, and is connected electrically to the image processing unit, that includes a sharpening filter, a superimposer, and an edge detector. The sharpening filter converts the original image into a sharpened edge image, and the superimposer superimposes the original image to the sharpened edge image, to form an enhanced image. The edge detector fetches the edge of the enhanced image, to obtain a differential edge image. The image processing unit then utilizes selectively the horizontal correction or vertical correction to correct the differential edge image, based on s deviation direction of the differential edge image, to form a corrected image, and provide it to the image output unit to output as required.

8 Claims, 6 Drawing Sheets

SELF-ADAPTIVE IMAGE EDGE CORRECTION DEVICE AND METHOD THEREOF

BACKGROUND OF THE INVENTION

1. Field of the Invention

The present invention relates to an image correction technology, and in particular to a self-adaptive image edge correction device and method thereof, that is capable of improving the edge blurring and edge saw-tooth phenomena of an image.

2. The Prior Arts

In monitoring an image at a long distance, the image has to be enlarged to be viewed clearly. Also, to obtain an image of high resolution for that image originally of low resolution, in general, polynomial interpolation is utilized to magnify and enlarge the image. However, the magnified image could produce blurring and saw-tooth phenomena, thus leading to distortion. In this respect, the main reason for blurring is that, the effect of interpolation is equivalent to filtering out the high frequency portion of an image using a low-pass filter, hereby causing image blurring. In addition, the edge of the enlarged image could develop irregularities caused by the dislocations during interpolation, to produce saw-tooth of edges. For the reasons mentioned above, image edge blurring and saw-tooth are produced during polynomial interpolation.

To improve the shortcomings of the prior art mentioned above, two approaches are utilized to eliminate this phenomenon for the digital photos. Wherein, one approach is to increase the resolution to the extent that blurring and saw-tooth can not be discerned by the human eyes, but this could inevitably lead to increased cost. The other approach is to use a bi-linear interpolation in cooperation with a blurring filter. Yet, this could consume too much time, dire to its complicated computation process.

Moreover, to improve the edge saw-tooth phenomenon, the following approaches can be utilized: Low-Pass Filter, Error-Amended Sharp Edge, Linear Minimum Mean Square-Error Estimation, Fast Edge-Oriented Interpolation, or Grey Polynomial Interpolation. Yet, the utilization of the Low-Pass Filter could cause distortion of the entire image; the application of the Error-Amended Sharp Edge or Linear Minimum Mean Square-Error Estimation could lead to overly large computation amount, and overly long computation time; while the use of Fast Edge-Oriented Interpolation, or Grey Polynomial Interpolation requires repeated tests of threshold values, that is rather time consuming.

Therefore, presently, the design and performance of image interpolation is not quite satisfactory, and it has much room for improvements.

SUMMARY OF THE INVENTION

In view of the problems and drawbacks of the prior art, the present invention provides a self-adaptive image edge correction device and method thereof, to overcome effectively the problem of the prior art.

A major objective of the present invention is to provide a self-adaptive image edge correction device and method thereof, so that edge blurring can be corrected during image enlargement, to enhance image edge and improve blurring and saw-tooth of edge of the prior art.

Another objective of the present case is to provide self-adaptive image edge correction device and method thereof, that is able to achieve edge correction at fast speed and with small computation amount for images of various sizes.

A further objective of the present case is to provide a self-adaptive image edge correction device and method thereof, that can be used to various applications to meet wide scope of demands, for example, images of low resolution or images having edge distortion.

In order to achieve the above mentioned objective, the present invention provides a self-adaptive image edge correction device and method thereof, including the following steps. Firstly, input an original image; next, sharpen the original image, to convert the original image into a sharpened edge image; then, add the original image to the sharpened edge image, to form an enhanced image; subsequently, fetch edges of the enhanced image, to obtain a differential edge image; and finally, determine the deviation direction of the differential edge image, to selectively utilize horizontal correction or vertical correction, to amend the differential edge image to obtain a corrected image.

In addition, the present invention provides a self-adaptive image correction device, including an image fetching an image processing unit, and an image output unit. Wherein, the image fetching unit is used to provide an original image. The image processing unit is connected electrically to the image fetching unit, and it includes a sharpening filter, a superimposer, and an edge detector. The sharpening filter converts the original image into a sharpened edge image, and the sharpening filter is connected electrically to the superimposer, and it adds the original image to the sharpened edge image, to form an enhanced image. The edge detector is connected electrically to the superimposer, to fetch the edge of the enhanced image, to obtain a differential edge image. The processor utilizes selectively the horizontal correction or vertical correction to correct the differential edge image, based on the deviation direction of the differential edge image, to obtain a corrected image. The image output unit is connected electrically to the processor, to output the corrected image.

Further scope of the applicability of the present invention will become apparent from the detailed descriptions given hereinafter. However, it should be understood that the detailed descriptions and specific examples, while indicating preferred embodiments of the present invention, are given by way of illustration only, since various changes and modifications within the spirit and scope of the present invention will become apparent to those skilled in the art from this detailed descriptions.

BRIEF DESCRIPTION OF THE DRAWINGS

The related drawings in connection with the detailed descriptions of the present invention to be made later are described briefly as follows, in which.

DETAILED DESCRIPTION OF THE PREFERRED EMBODIMENT

The purpose, construction, features, functions and advantages of the present invention can be appreciated and understood more thoroughly through the following detailed description with reference to the attached drawings.

The present invention is capable of correcting blurring and saw-tooth for edges of the enlarged images of low resolution, so that the image edge can be smooth, hereby improving quality of the output image.

Figure 1:
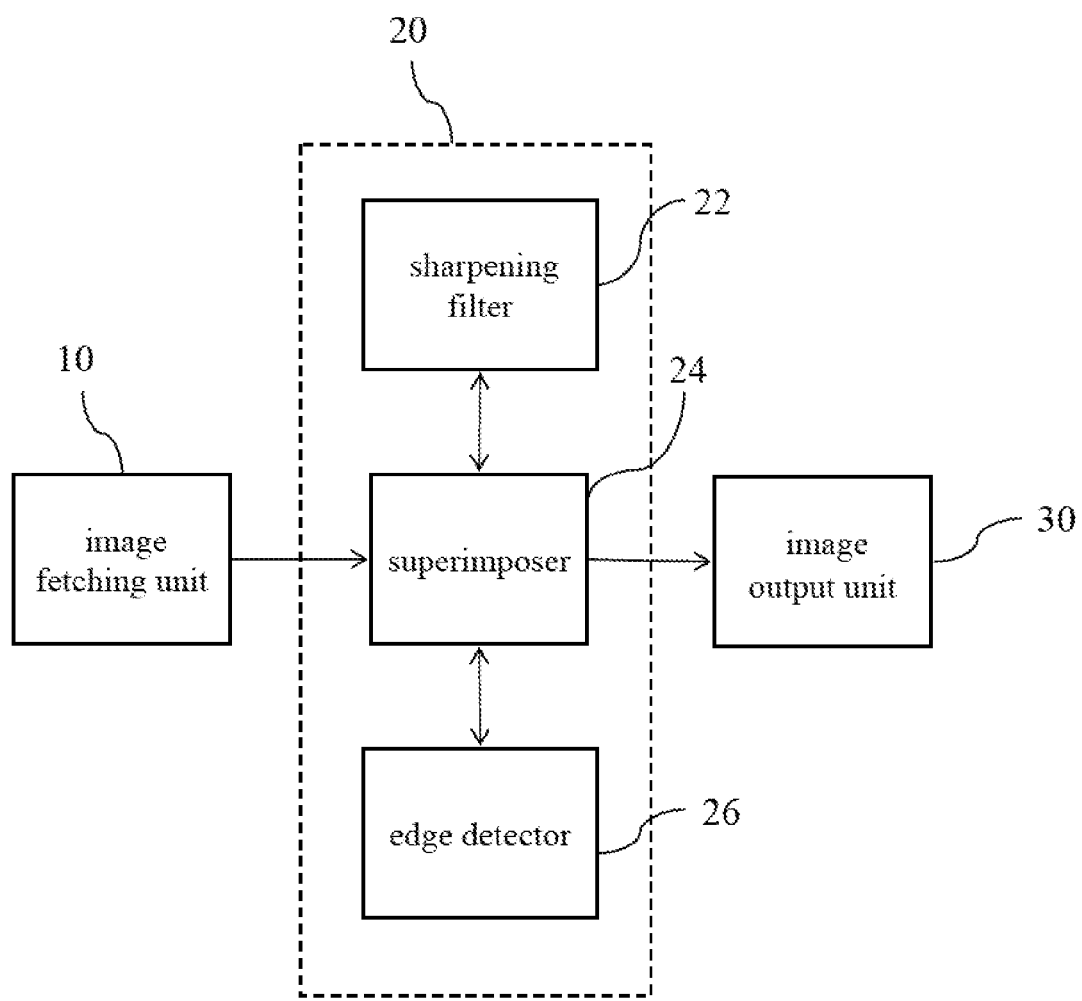
FIG. 1 is a system block diagram of a self-adaptive image edge correction device according to the present invention.

Firstly, refer to FIG. 1 for a system block diagram of a self-adaptive image edge correction device according to the present invention. As shown in FIG. 1, the self-adaptive image edge correction device includes: an image fetching unit 10, an image processing unit 20, and an image output unit 30. Wherein, the image fetching unit 10 can be a camera, used to fetch an image to provide it as an input original image, and is connected to an image processing unit 20. The image processing unit 20 includes a sharpening filter 22, a superimposer 24, and an edge detector 26. The sharpening filter 22 can be a Laplacian filter, in the present embodiment, the Laplacian filter is used as example for explanation, but the present invention is not limited to this, such that it converts the original image into sharpened edge image, and is connected electrically to the superimposer 24. The superimposer 24 is used to add the original image to the sharpened edge image, to form an enhanced image. The edge detector 26 is connected electrically to the superimposer 24, to fetch the edge of the enhanced image, to produce a differential edge image. The image processing unit 20 utilizes selectively the horizontal correction or vertical correction to correct the differential edge image, based on the deviation direction of the differential edge image, to amend the blurring and saw-tooth of the image edge, to obtain a corrected image. The image output unit 30 is connected electrically to the image processing unit 20, to output the corrected image.

Figure 2:
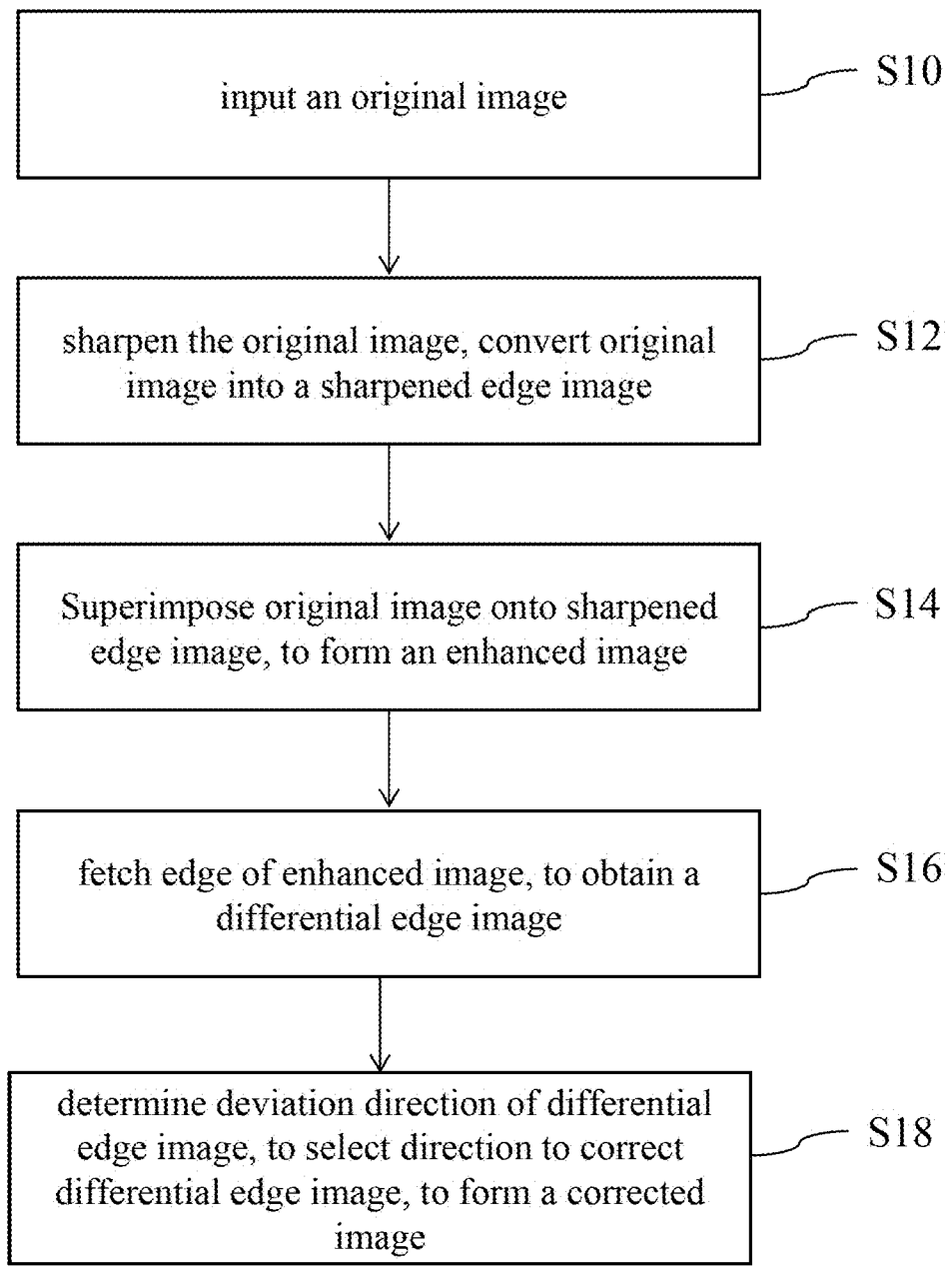
FIG. 2 is a flowchart of the steps of a self-adaptive image edge correction method according to the present invention.
Figure 3A:
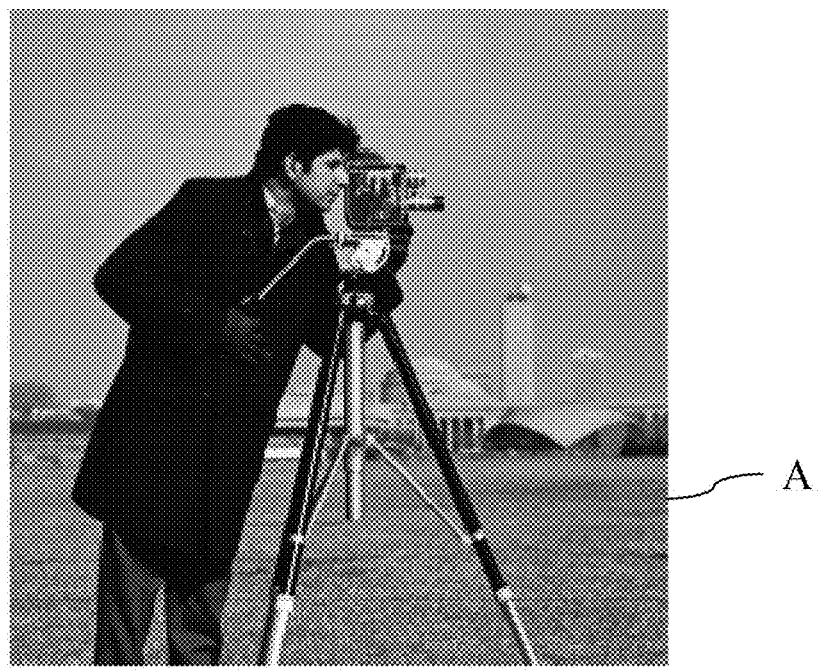
FIGS. 3A to 3E are the schematic diagrams respectively for implementing various steps of the self-adaptive image edge correction method according to the present invention.
Figure 3B:
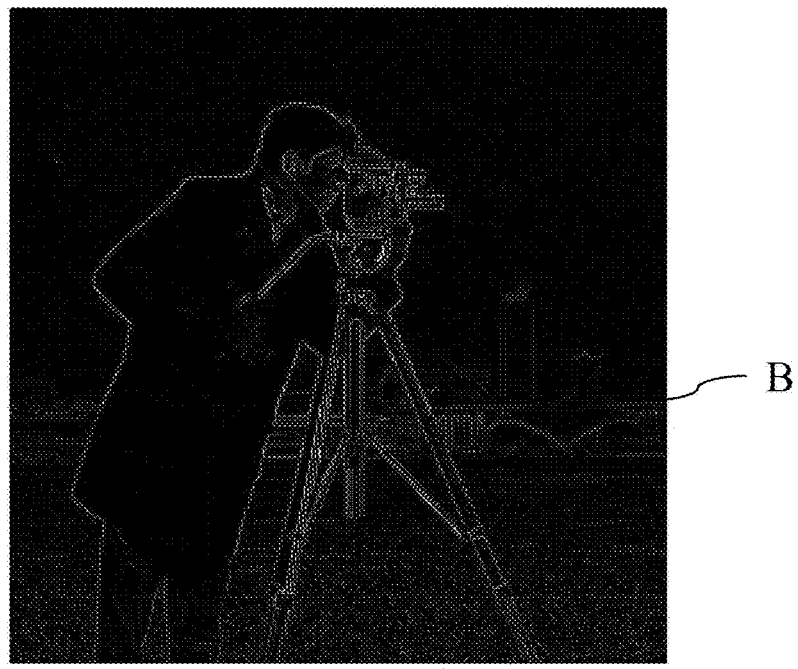
Figure 3C:
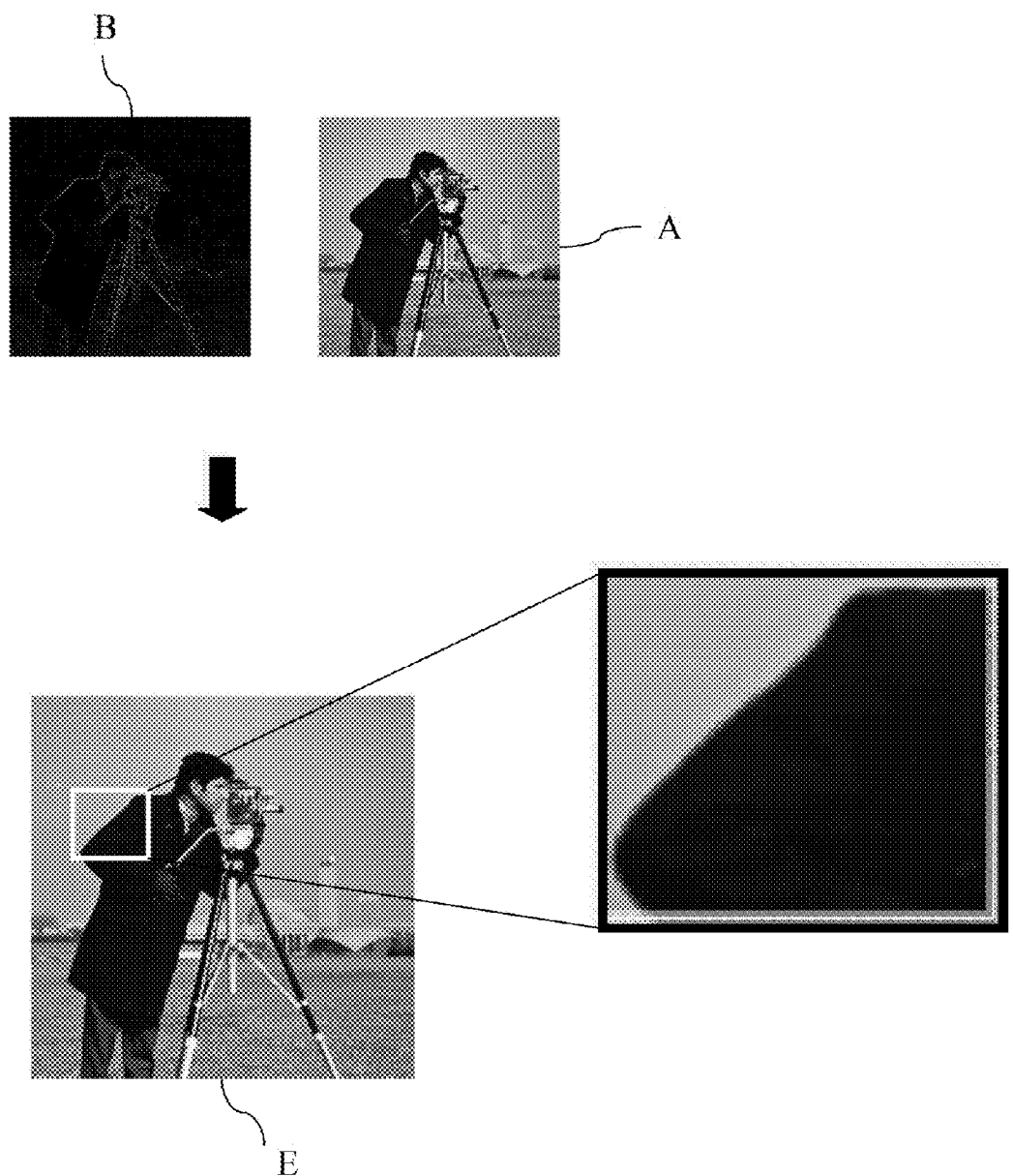
Figure 3D:

Then, refer to FIGS. 1, 2, 3A to 3E at the same e. Wherein, FIG. 2 is a flowchart of the steps of a self-adaptive image edge correction method according to the present invention. FIGS. 3A to 3E are the schematic diagrams respectively for implementing various steps of the self-adaptive image edge correction method according to the present invention. Firstly, as shown in step S10 and refer to FIG. 3A. In the beginning, the image fetching unit 10 is used to fetch images and to input it as an original image A to the superimposer 24, which magnifies the original image A. In case the amount of pixels of the image fetching unit 10 is not sufficiently large, then the edge of the magnified original image A tends to develop blurring and saw-tooth. Then, in order to correct the blurring of the magnified original image A, as shown in step S12, a sharpening filter 22 is used to convert the magnified original image A to a sharpened edge image B as shown in FIG. 3B. Subsequently, as shown in step S14 and with reference to FIG. 3C, the superimposer 24 is used to combine and superimpose the magnified original image A onto the sharpened edge image B, to form an enhanced image E. Though in step S14, the blurring of the enhanced image E is improved, yet the saw-tooth phenomenon still exists. Therefore, in order to correct the saw-tooth phenomenon, as shown in step S16, and edge detector 26 is used to fetch edges of the enhanced image E, to obtain a differential edge image C as shown in FIG. 3D. Finally, as shown in step S18, the image processing unit 20 is used to determine the deviation direction of the differential edge image C, to selectively utilize the horizontal correction or the vertical correction, to amend the differential edge image to obtain a corrected image. Wherein, the determination of the deviation direction is based on as determination equation, as shown in the following equation (1):

$$\text{sign}\left(C_{i,j} \times \left(\begin{array}{l} norm\left(\frac{(E_{i-1,j-1}-E_{i-1,j+1})+2(E_{i,j-1}-E_{i,j+1})+(E_{i+1,j-1}-E_{i+1,j+1})}{4}\right)- \\ norm\left(\frac{(E_{i-1,j-1}-E_{i+1,j-1})+2(E_{i-1,j}-E_{i+1,j})+(E_{i-1,j-1}-E_{i+1,j+1})}{4}\right) \end{array}\right)\right) = K \quad (1)$$

Wherein, sign is a binary; C is a differential edge image; norm is a decimal; E is an enhanced image; i, j are the coordinates of the candidate correction points; and K=0, 1, −1 represent the directions in which corrections are required.

Figure 4:
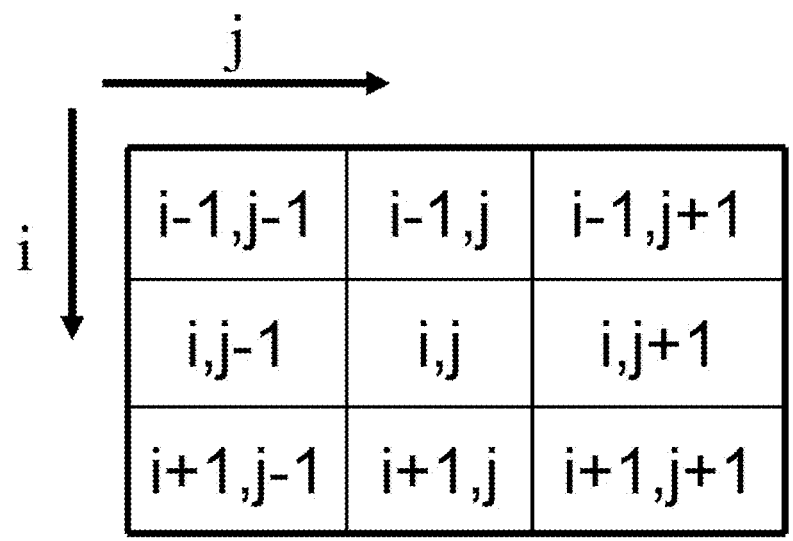
FIG. 4 is a schematic diagram showing computations for correcting saw-tooth edge of an image according to the present invention.

Then, refer to FIG. 4 for a schematic diagram showing computations for correcting saw-tooth edge of an image according to the present invention. As shown in FIG. 4, the determination equation computes and determines the saw-tooth deviation direction, based on the edge of the center points i and j. Wherein, in case the result of computing equation (1) is K=−1, that indicates correction is required in the vertical direction, then a vertical correction equation is used to correct the image. In case the result of computing equation (1) is K=1, that indicates correction is required in the horizontal direction, then a horizontal correction equation is used to correct the image. In case the result of computing equation (1) is K=0, that indicates no correction is required to be made. Wherein, the horizontal correction equation is as shown in the equation (2) as follows:

$$D_{i,j-1}=\frac{1}{2}(D_{i,j-1}+D_{i,j-2}) \quad D_{i,j+1}=\frac{1}{2}(D_{i,j+1}+D_{i,j+2}) \quad (2)$$

Wherein, D is a corrected image; i,j are the coordinates of the candidate correction points.

Furthermore, the vertical correction equation is as shown in equation (3) as follows:

$$D_{i-1,j}=\frac{1}{2}(D_{i-1,j}+D_{i-2,j})$$

$$D_{i+1,j}=\frac{1}{2}(D_{i+1,j}+D_{i+2,j}) \quad (3)$$

Wherein, D is a corrected image; i,j are the coordinates of the candidate correction points.

Figure 3E:
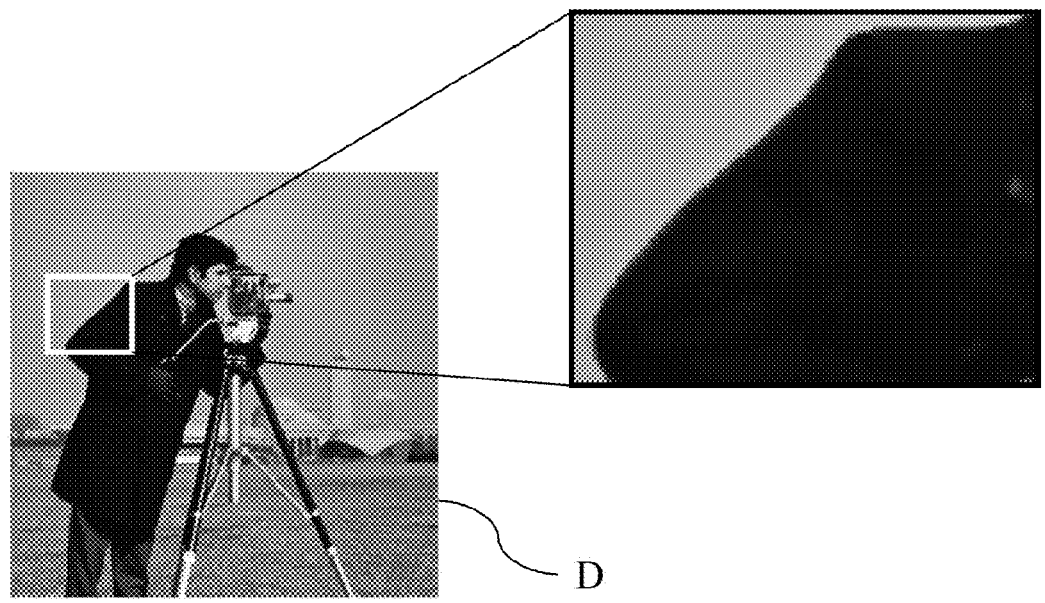

Finally, as shown in FIG. 3E, the corrected image D is evidently smooth and perfect without blurring and saw-tooth, and is provided to the image output unit 30 to output to the outside as required.

According to the descriptions mentioned above, the present invention provides a self-adaptive image edge correction method, that is able to achieve fast speed with small computation amount for images of various sizes, and can be applicable in various image related system or technology, such as Around View Monitor (AVM), image processing software, camera, and display. Wherein, the original image of low pixel amount is magnified and enlarged, such that the blurring and saw-tooth of image edge are processed and corrected in a fast and simple approach, to achieve raised image quality and better visual effect.

Summing up the above, the present invention can be used in various applications to meet wide scope of demands, such as images of low resolution or images having edge distortion, to enhance image edge, and improve image blurring and saw-tooth at fast speed and with low computation amount. The present invention is applicable to images of various sizes, without the need to raise image to any specific resolution.

The above detailed description of the preferred embodiment is intended to describe more clearly the characteristics and spirit of the present invention. However, the preferred embodiments disclosed above are not intended to be any restrictions to the scope of the present invention. Conversely, its purpose is to include the various changes and equivalent arrangements which are within the scope of the appended claims.

What is claimed is:

1. A self-adaptive image edge correction method, comprising:
   inputting an original image;
   sharpening said original image, to convert said original image into a sharpened edge image;
   superimposing said original image onto said sharpened edge image, to form an enhanced image;
   fetching an edge of said enhanced image, to obtain a differential edge image;
   determining deviation direction of said differential edge image
   selectively utilizing horizontal correction or vertical correction based on the determined deviation direction of said differential edge image; and
   correcting said differential edge image based on the selectively utilized horizontal correction or vertical correction to obtain a corrected image.

2. The self-adaptive image edge correction method as claimed in claim 1, further comprising:
   in determining the deviation direction of said differential edge image, in case the horizontal correction is selected, then utilizing a horizontal correction equation to perform the horizontal correction; and in case the vertical correction is selected, then utilizing a vertical correction equation to perform the vertical correction.

3. The self-adaptive image edge correction method as claimed in claim 2, wherein
   said horizontal correction equation is as follows:

$D_{i,j-1} = \frac{1}{2}(D_{i,j-1}+D_{i,j-2}) D_{i,j+1} = \frac{1}{2}(D_{i,j+1}+D_{i,j+2})$ wherein, D is said corrected image; and i, j are coordinates of candidate correction points.

4. The self-adaptive image edge correction method as claimed in claim 2, wherein
said vertical correction equation is as follows:

$D_{i-1,j} = \frac{1}{2}(D_{i-1,j}+D_{i-2,j})$ $D_{i+1,j} = \frac{1}{2}(D_{i+1,j}+D_{i+2,j})$ wherein, D is said corrected image; and i, j are coordinates of candidate correction points.

5. The self-adaptive image edge correction method as claimed in claim 1, wherein
   in determining the deviation direction of said differential edge image, a following determination equation is utilized:

$$\text{sign}\left(C_{i,j} \times \left(\begin{array}{c} \text{norm}\left(\dfrac{(E_{i-1,j-1}-E_{i-1,j+1})+2(E_{i,j-1}-E_{i,j+1})+(E_{i+1,j-1}-E_{i+1,j+1})}{4}\right) \\ -\text{norm}\left(\dfrac{(E_{i-1,j-1}-E_{i+1,j-1})+2(E_{i-1,j}-E_{i+1,j})+(E_{i-1,j+1}-E_{i+1,j+1})}{4}\right) \end{array}\right)\right) = K$$

wherein, sign is a binary; C is said differential edge image; norm is a decimal; E is said enhanced image; i, j are coordinates of candidate correction points; and K=0, 1, −1 represent directions in which corrections are required, and
   wherein when K=−1, the vertical correction is utilized, when K=1, the horizontal correction is utilized, and when K=0, no correction is required.

6. The self-adaptive image edge correction method as claimed in claim 1, wherein
   in sharpening said original image, a sharpening filter is used to obtain a sharpened edge image.

7. The self-adaptive image edge correction method as claimed in claim 1, wherein
   in fetching edge of said enhanced image, an edge detector is utilized.

8. The self-adaptive image edge correction method as claimed in claim 1, further comprising:
   magnifying said input original image into a magnified original image,
   wherein the magnified original image is sharpened.

* * * * *